Aug. 24, 1954  E. R. SWANN  2,686,962
METHOD OF MAKING FLEXIBLE HOSE
Original Filed June 29, 1950  4 Sheets-Sheet 1

INVENTOR.
Edward R. Swann
BY
Harry S. Bucaess
ATTORNEY.

Aug. 24, 1954 — E. R. SWANN — 2,686,962
METHOD OF MAKING FLEXIBLE HOSE
Original Filed June 29, 1950 — 4 Sheets-Sheet 2
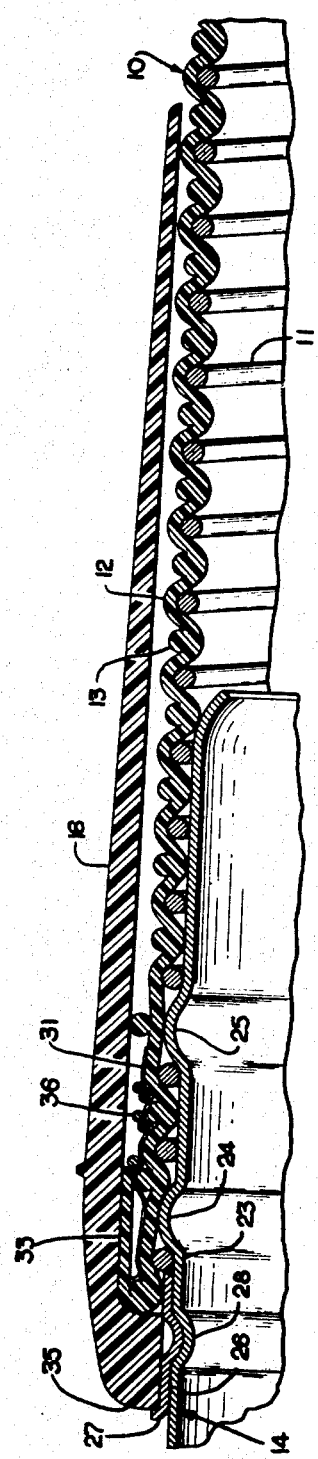
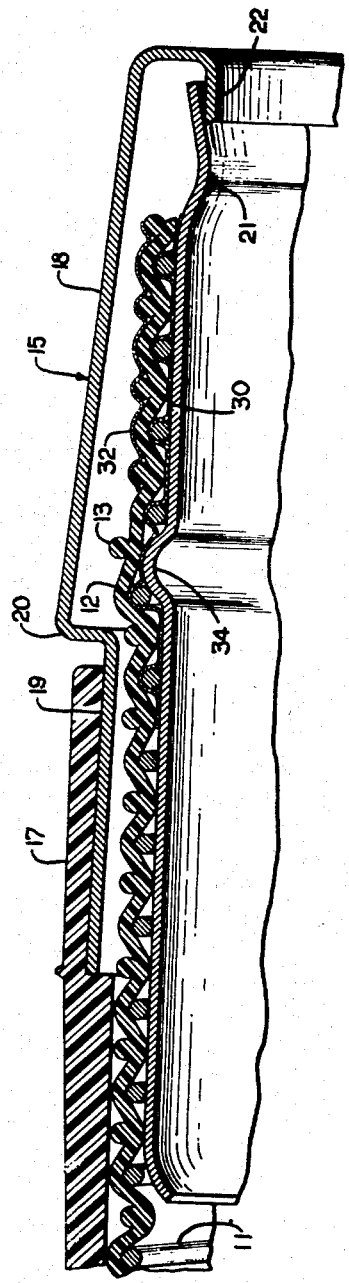
INVENTOR.
Edward R. Swann
BY Harry S. Dumaine
ATTORNEY.

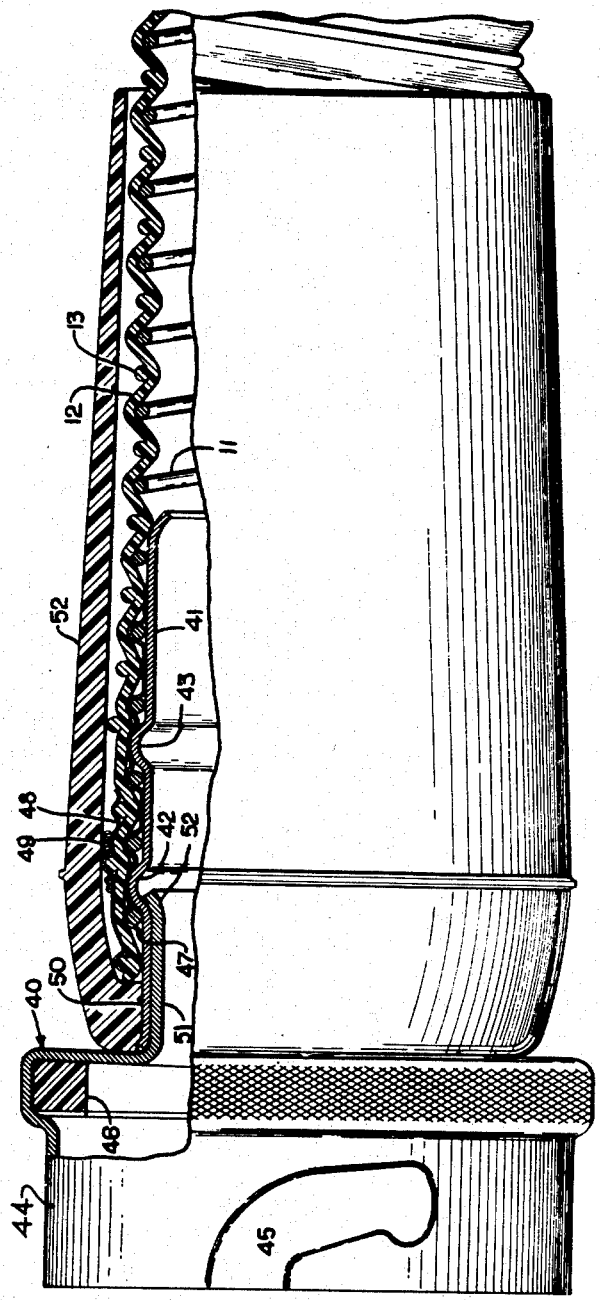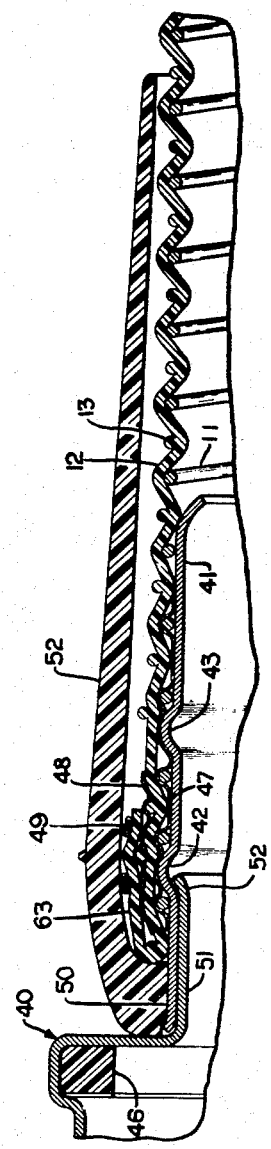
INVENTOR.
Edward R. Swann

Aug. 24, 1954     E. R. SWANN     2,686,962
METHOD OF MAKING FLEXIBLE HOSE
Original Filed June 29, 1950     4 Sheets-Sheet 4

INVENTOR.
Edward R. Swann
BY
ATTORNEY.

Patented Aug. 24, 1954

2,686,962

UNITED STATES PATENT OFFICE 2,686,962

METHOD OF MAKING FLEXIBLE HOSE

Edward R. Swann, North Canton, Ohio, assignor to The Hoover Company, North Canton, Ohio, a corporation of Ohio Original application June 29, 1950, Serial No. 171,018. Divided and this application May 2, 1951, Serial No. 224,170

5 Claims. (Cl. 29—435)

This invention relates to flexible hose and particularly to the method of making the connection between the hose proper and the fitting or nipple by which the ends of the hose may be attached to complementary fittings.

This application is a division of my copending application for United States Letters Patent Serial No. 171,018, filed June 29, 1950, which claims the connection while the present application claims the method of making the connection.

The hose to which the present invention relates is made in accordance with the procedure disclosed and claimed in an application for United States Letters Patent by Frank A. Martin and Kenneth R. Warburton, Serial No. 162,883, filed May 19, 1950, now Patent No. 2,641,302, issued June 9, 1943. One modification of the present invention is disclosed but not claimed in an application for United States Letters Patent by Frank A. Martin and Kenneth R. Warburton, Serial No. 162,882, filed May 19, 1950, now Patent No. 2,641,300, issued June 9, 1953.

The hose made according to the disclosures of the above identified applications consists of an inner spirally wound reenforcing wire and a thin walled tube of elastomeric thermoplastic, the walls of which are drawn inwardly between the coils of the wire by an elastomeric thermoplastic cord wound under constant tension about the tube walls and fused thereto between the coils of the wire.

It is very difficult to attach the ends of such a thin walled tube to fittings for attachment to complementary fittings in order to render the hose readily attachable to and detachable from a suction cleaner or hand tools usable with a suction cleaner.

According to the present invention the above mentioned problem has been successfully solved. According to one phase of the present invention a comparatively long tapered sleeve of an elastomeric thermoplastic slightly stiffer than the wall of the elastomeric thermoplastic tube is anchored to the fitting at its thick end and its thin end extends beyond the inner end of the fitting a substantial distance so as to prevent the tube walls from being bent too abruptly about the end of the fitting and to distribute the bending effect over a substantial length of the tube wall so as to prevent displacement of the wire from one corrugation to an adjacent one.

According to another aspect of the present invention, the end coils of the reenforcing wire fit over ribs on the fitting, the tube wall fits closely about the end coils of the wire, the elastomeric thermoplastic cord is taped to the tube wall in addition to being fused thereto and a stout nonelastic cord is wound about the tape, the tube wall, the end coils of the elastic cord and the end coils of the spring.

Other objects and advantages of the invention will become apparent as the description proceeds when taken in connection with the accompanying drawings in which:

Figure 2 is an enlarged sectional view of one form of my invention;

Figure 3 is an enlarged sectional view of a second form of the invention;

Figure 4 is an enlarged sectional view of a third form of the invention;

Figure 6 is an enlarged sectional view of a fifth form of the invention.

Figure 1:
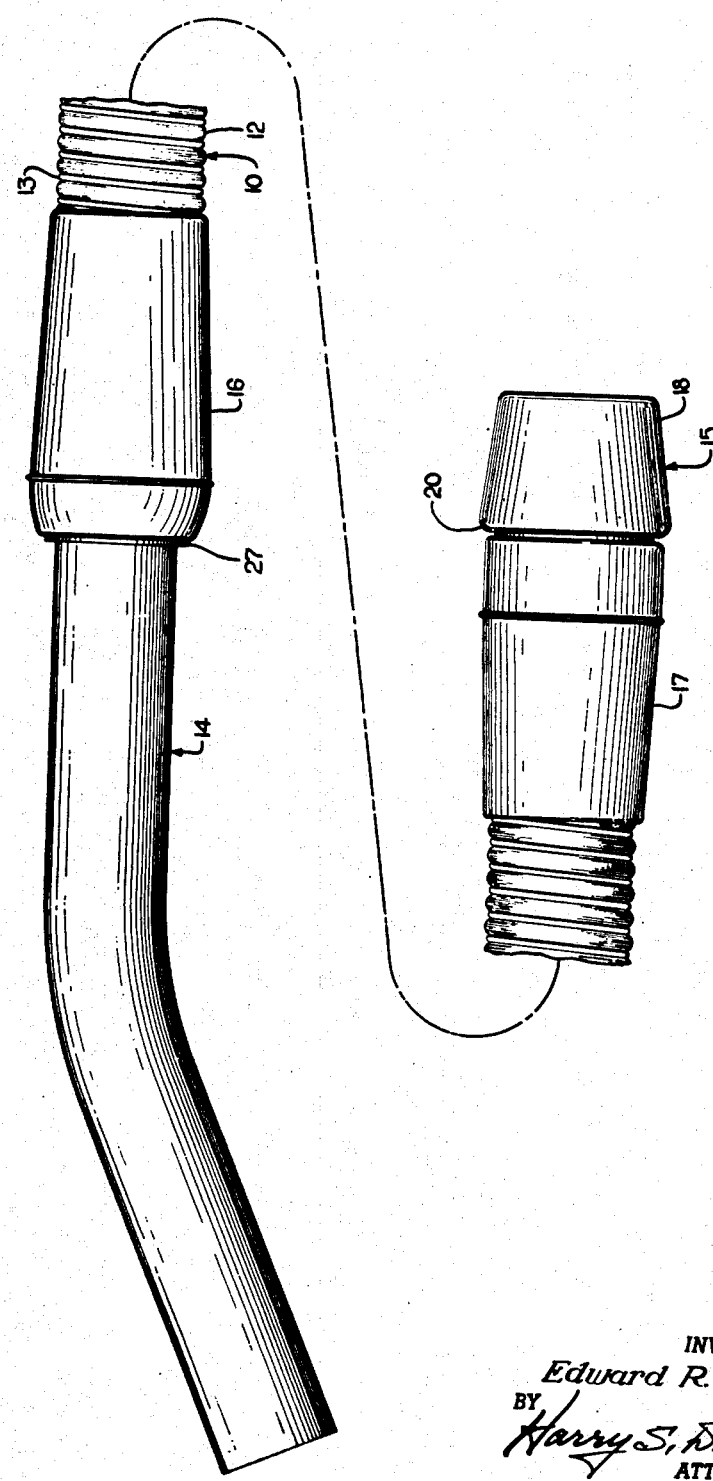
Figure 1 is a plan view of a suction cleaner hose, shown broken and bent back upon itself as indicated by the dot-dash line, with this invention applied thereto.

Referring to the drawings, the hose to which this invention relates is generally indicated by the reference numeral 10. The hose wall is made up of a helically wound spring steel wire 11, an extruded seamless tube 12 of polyvinyl chloride or copolymers of vinyl chloride with vinyl acetate and an elastomeric thermoplastic cord 13 of the same material wound spirally about the tube between the coils of the wire and fused to the tube wall between the coils of the wire 11.

The diameter, pitch and length of the coil 11, the expansion given to it, the diameter and tensile strength of the wire, the tensile strength or hardness of the tube 12 and cord 13 and the tension applied to the cord during winding operation depends upon the strength, durability and flexibility of the hose desired. The tensile strength or hardness of the tube 12 and cord 13 depends upon the amount of plasticizer mixed with the vinyl material in making the extruding mix. The inside diameter of the tube should be the same as that of the coil 11 and its length the same as that of the coil 11 in an expanded condition.

In making flexible hose for suction cleaners it has been found that the following conditions are satisfactory.

The coil 11 may be made of spring steel wire 0.058 inch in diameter and having a tensile strength of 275,000 pounds per square inch. The inside diameter of the coil 11 and the tube 12 may be 1⅜ inches. The pitch of the coil in its free state may be 0.250 inch expanded to 0.286 inch during the expanding operation and its length in expanded form approximately 113 inches. The tube 12 may be made of elastomeric thermoplastic having a tensile strength of 2,000 pounds per square inch at 85° F. and the wall thickness may be 0.026 inch. The cord 13 should be of the same strength or hardness as the tube 12. It may be slightly harder but should not be softer. A cord having a diameter of 0.076 inch and a tensile strength of 2,000 pounds per square inch at 85° F. has been found satisfactory. The tension applied to the cord during the winding operation may be between 65 and 71 ounces which will reduce the cord diameter to approximately 0.060 inch.

It is to be understood that the above figures are exemplary only and that the conditions, dimensions, etc., may be varied widely depending upon the strength, durability and flexibility of the hose desired.

A fitting 14 for attachment to dusting tools and a fitting 15 for attachment to a cylinder type suction cleaner are attached to the opposite ends of the hose 10. Protecting sleeves 16 and 17 are anchored to the fittings 14 and 15 respectively. The protecting sleeves 16 and 17 may be made of an elastomeric thermoplastic somewhat stiffer than that of the tube wall 12.

Referring to Fig. 2 the fitting 15 comprises a sleeve having a tapered portion 18 and a cylindrical portion 19 of a reduced diameter separated by a coupling shoulder 20 and an inner cylindrical nipple 21 one end of which is fitted into the backwardly turned end 22 of the tapered portion 18.

Referring to Fig. 3 the fitting 14 includes a cylindrical nipple 23 having a pair of spaced peripheral ribs 24 and 25 formed by bulging the material of the walls outwardly. A protecting sleeve positioning ring 26 having an outturned flange 27 is suitably secured to the cylindrical portion 23 such as by rolling their walls inwardly as shown at 28.

In making the hose 10, the nipple 21 is slid over the tail stock end of the mandrel of a winding machine such as shown and described in the above mentioned applications and is anchored to the mandrel in any suitable manner. The spring 11 is then placed over the mandrel and nipple 21 and a few layers of friction tape 30 applied over the end coils of the spring. The coils of the spring 11 are then spaced as disclosed in the above mentioned application and the head stock end of the spring is anchored to the mandrel in any suitable manner.

The tube 12 is then blown over the mandrel and the expanded spring 11. A few turns of the cord 13 are then wound about the tube at the head stock end and taped thereto by the application of a few layers of friction tape 31. The cord 11 is then wound under constant tension about the tube 12 in the manner disclosed in the above mentioned applications and the end turns taped to the tube 12 by a few layers of friction tape 32. The end 33 of the tube is then turned rearwardly over the cord 13 and tape 31. The partially completed hose carcass is then removed from the mandrel and treated as disclosed in the above mentioned application Serial No. 162,883 so as to fuse the cord 13 to the wall of the tube 12. According to the aforementioned application a solvent is applied between the cord and tube and the carcass heated to fuse the cord and tube together where they are in contact with each other.

The protecting sleeve 17 is then cemented to the cylindrical portion 19 of the fitting 15, expanded and slid over the end of the hose 10. If desired a suitable cement may be applied to the hose and to the interior of the sleeve 17 prior to its assembly. The inturned end 22 of the tapered portion 18 will enter the bore of nipple 21. The wall of nipple 21 is then expanded outwardly as shown at 34 so as to force the wall of the hose outwardly into the recess formed by the shoulder 20 so as to anchor the end of the hose to the fitting 15.

The nipple 23 is then forced into the other end of the hose using water as a lubricant so that the ribs 24 and 25 will lie between adjacent coils of wire 11 and the inner end of the positioning sleeve 26 will extend into the hose end beneath the tube 12.

A few turns of stout non-elastic cord 36 is then tightly wound about the tape 31 between the ribs 24 and 25 to firmly anchor the fitting 14 to the hose end.

The protecting sleeve 16 is then expanded and slid over the fitting 14 so that its inturned annular flange 35 will rest on positioning ring 26 against the shoulder 27. A suitable cement may be applied to the ring 26 and to the flange 35 before the sleeve 16 is applied to the hose.

Figure 5:
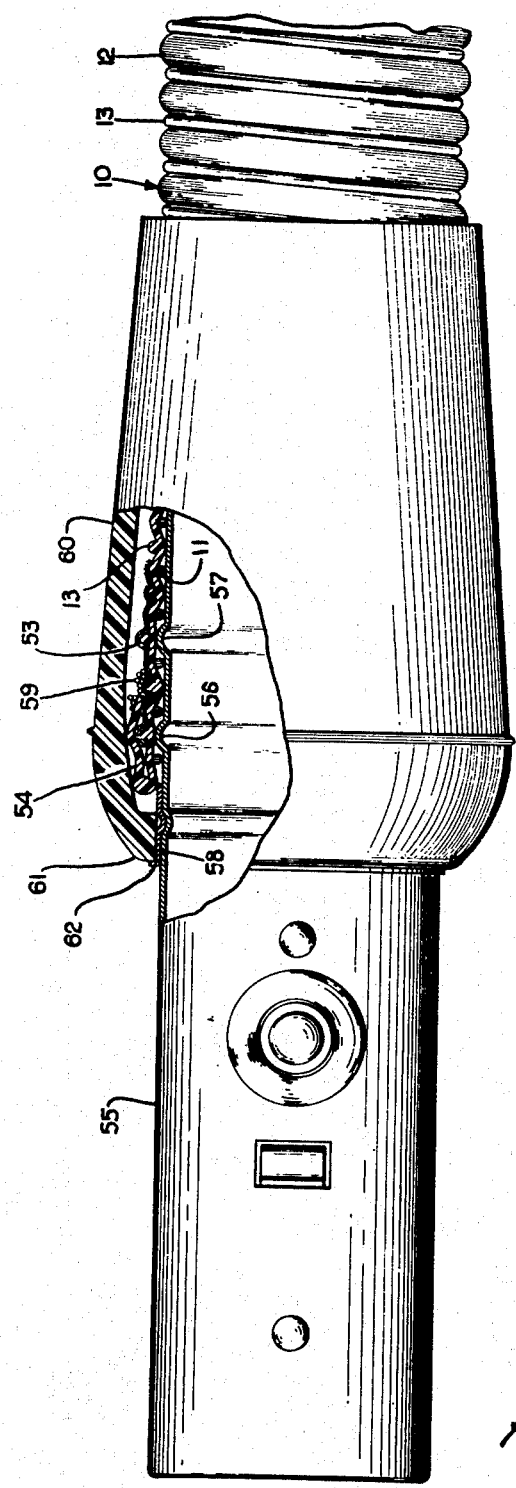
Figure 5 is an enlarged sectional view of a fourth form of the invention.

The modifications of Figs. 4, 5, and 6 are similar to those just described and where the parts are the same they have been given the same reference numerals.

Referring to Fig. 4 the fitting 40 comprises a nipple 41 having outwardly extending ribs 42 and 43 and an attaching fitting 44 having a bayonet connection 45 for cooperation with a complementary fitting on the converter of a suction cleaner. A suitable sealing gasket 46 is provided in a shouldered recess of fitting 44. The protecting sleeve 52 is substantially the same as the sleeve 16 of Fig. 3.

In making the hose of Fig. 4 the nipple 41 is placed on a mandrel and the coil 11 applied as explained in connection with Figs. 2 and 3. It is to be noted that the ribs 42 and 43 lie between adjacent coils of the wire 11. The end coils of the wire 11 are then taped to the fitting 41 by pressure sensitive tape 47 and the tube 12 and the cord 13 applied as explained above, the end coils of the cord 13 being taped to the tube 12 by pressure sensitive tape 48.

After the hose carcass is treated as disclosed in the above mentioned application, Serial No. 162,883 a few turns of stout non-elastic cord 49 is wound tightly over the tape 48, it being noted that the cord 49 partially overlies the rib 42 of nipple 41 and clamps the tube wall tightly to the nipple 41 immediately in back of the rib 42.

The protecting sleeve 52 is then expanded and slid over the hose end with its inwardly extending flange 50 embracing the nipple 41 adjacent the end of the tube 12. A suitable cement may be applied to the interior of the flange 50 and to the end of nipple 41.

The cylindrical portion 51 of the fitting 40 is then slid into the open end of the nipple 41 and its end 52 expanded into the interior of the rib 42 completing the assembly.

Fig. 5 shows a connection for the head stock end of a hose 10 made in accordance with the disclosure of the above mentioned application, Serial No. 162,883. The end coils of the cord 13 are taped to the tube 12 by pressure sensitive tape 53 and the end 54 of the tube 12 is turned backwardly over the tape 53. After the hose carcass is treated as disclosed in the above mentioned application the inner end of fitting 55 having outwardly extending ribs 56 and 57 is forced into the open end of the hose 10 using water as a lubricant so that the ribs 56 and 57 lie between adjacent coils of the wire 11 and the positioning ring 58 abuts the rearwardly turned end 54 of the tube 12. A stout non-elastic cord 59 is wound tightly about the rearwardly turned end 54 of the tube 12 it being noted that the cord 59 tightly clamps the hose wall to the fitting 55 substantially midway between the ribs 56 and 57.

The protecting sleeve 60, which is substantially the same as the sleeve 16 of Fig. 3 is then expanded and slid over the end of the hose so that its inwardly extending flange 61 rests on the positioning ring 58 against the shoulder 62. Suitable cement may be used as in the other modification.

Fig. 6 is substantially the same as Fig. 4 except that the end 63 of tube 12 is turned backwardly over the tape 48 and the cord 49 is wound over the backwardly turned end 63.

While I have shown but five modifications of my invention it is to be understood that these modifications are to be taken as illustrative only and not in a limiting sense. I do not wish to be limited to the particular method shown and described but to include all equivalent variations thereof except as limited by the scope of the claims.

I claim:

1. The method of making a hose coupling including a thin walled hose body and an attachment fitting extending into the interior of said body at its end comprising, applying a thin walled elastomeric thermoplastic tube to an expanded cylindrical coiled spring having substantially the same internal diameter as the tube, winding an elastomeric thermoplastic cord under tension over the tube between the convolutions of the spring, curing the foregoing assembly to bond the cord to the tube to thus form said thin walled hose body and anchoring said attachment fitting to said hose body.

2. The method according to claim 1 in which the anchoring step is carried out by expanding the walls of the fitting outwardly between adjacent coils of the spring.

3. The method according to claim 1 in which the anchoring step is carried out by tightly winding a non-elastic textile cord about the hose body over said attachment fitting.

4. The method according to claim 1 including expanding a semi-elastic protecting sleeve, sliding it over the end of the tube and fitting and anchoring the sleeve to the fitting.

5. The method according to claim 3 in which the end of the tube is turned backwardly over the tape and the non-elastic binding element is wound about a backwardly turned end of the tube.

References Cited in the file of this patent

UNITED STATES PATENTS

| Number | Name | Date |
|---|---|---|
| 1,812,646 | Burd | June 20, 1931 |
| 1,892,551 | Hayman | Dec. 27, 1932 |
| 2,268,088 | Scholtes | Dec. 30, 1941 |
| 2,321,731 | Bouton | June 15, 1943 |
| 2,338,666 | Nelson | Jan. 4, 1944 |
| 2,442,640 | Dunn | June 1, 1948 |
| 2,610,869 | Allison | Sept. 16, 1952 |

FOREIGN PATENTS

| Number | Country | Date |
|---|---|---|
| 536,691 | Great Britain | May 23, 1941 |